May 11, 1965 J. M. YOST 3,183,008
X-SEAL

Filed March 4, 1963 2 Sheets-Sheet 1

INVENTOR.
James M. Yost

BY *Webb Mackay & Burden*
HIS ATTORNEYS

May 11, 1965   J. M. YOST   3,183,008
X-SEAL

Filed March 4, 1963   2 Sheets-Sheet 2

INVENTOR.
James M. Yost
BY
HIS ATTORNEYS

United States Patent Office 3,183,008
Patented May 11, 1965

3,183,008
X-SEAL
James M. Yost, Sewickley Heights, Pa., assignor to Allegheny Plastics, Inc., Coraopolis, Pa.
Filed Mar. 4, 1963, Ser. No. 263,677
3 Claims. (Cl. 277—207)

This application relates to a seal, more particularly it relates to a seal which may be used in applications where the conventional O-ring has been used. It is particularly adapted to use a material known as polytetrafluoroethylene, which is sold under the trade-mark "Teflon." In the interest of brevity, the material will be referred to as "Teflon." This application is a continuation-in-part of my application Serial No. 64,015, filed October 21, 1960, now abandoned.

The usefulness of rubber O-rings in static, oscillating shaft and reciprocating applications (and in some rotating shaft applications) is well known. The O-rings, however, have certain limitations which are: deterioration with age, susceptibility to chemical attack, and limitations as to the range of temperature conditions at which they will operate (60° F.–300° F.). Rubber O-rings also require lubrication and have a static coefficient of friction which is much higher than their running coefficient of friction.

It is also known that "Teflon" has a number of useful properties which make it particularly suitable as a material for seals. Thus, the material can be used in applications where high temperatures (up to 500° F.) are encountered. It is inert to chemical attack and it does not deteriorate with age. It requires no lubrication because it has the lowest coefficient of friction of any solid material known. Moreover, its static coefficient of friction is substantially the same as its running coefficient of friction.

"Teflon," however, has other characteristics which heretofore have prevented its use as a material for seals in many applications where O-rings can be used. It can be stretched only about 10% without permanent deformation, which makes O-ring seals of "Teflon" difficult to install in many applications. It has a coefficient of thermal expansion about 10 times that of steel which has prevented its use in applications where the temperature varies over a considerable range. Thus, if a "Teflon" O-ring seal is formed to make a tight seal at a particular temperature and if the temperature of the environment in which it is installed is raised, the seal may be permanently deformed. The result of this deformation is that the seal will not be effective if the temperature at which the seal is operating is subsequently lowered. Finally, it has not been possible to use a "Teflon" O-ring seal in situations calling for an interference fit because it is necessary to avoid excessive wear and heat build-up. This means that tolerances on "Teflon" O-ring seals have to be maintained very closely in order to achieve a good seal.

The seal which I have invented makes it possible to obtain all the good operating characteristics both of O-rings and of "Teflon." At the same time, the defects in "Teflon" O-ring seals which have been experienced heretofore, as described above, are avoided.

In the accompanying drawings, I have illustrated certain presently preferred embodiments of my invention in which.

Figure 1:
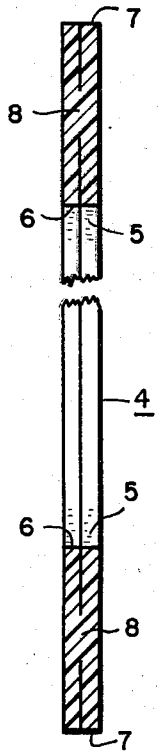
FIGURE 1 is a section through a blank used in making a seal embodying my invention.

FIGURE 1 shows a blank 4 from which a seal embodying my invention may be made. The blank is in the form of a flat, circular disk of "Teflon," having a central circular opening 5 bounded by an inner circular edge 6. Along a central plane extending parallel to the flat sides of the disk, the disk is split inwardly from the inner circular edge 6 and from the outer circular edge 7. The slits do not extend completely through the disk and thus leave a flat annular portion 8 between them.

Figure 2:
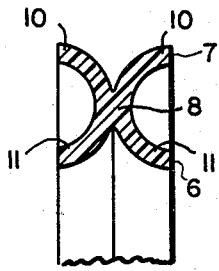
FIGURE 2 is a partial cross section of a seal embodying my invention.

After the blank 4 has been slit as just described, the portions adjacent the slits are bifurcated to form two curved lips 10 from the portion adjacent the outer circular edge 7 and two curved lips 11 from the portion adjacent the inner circular edge 6 (see FIGURE 2).

Figure 3:
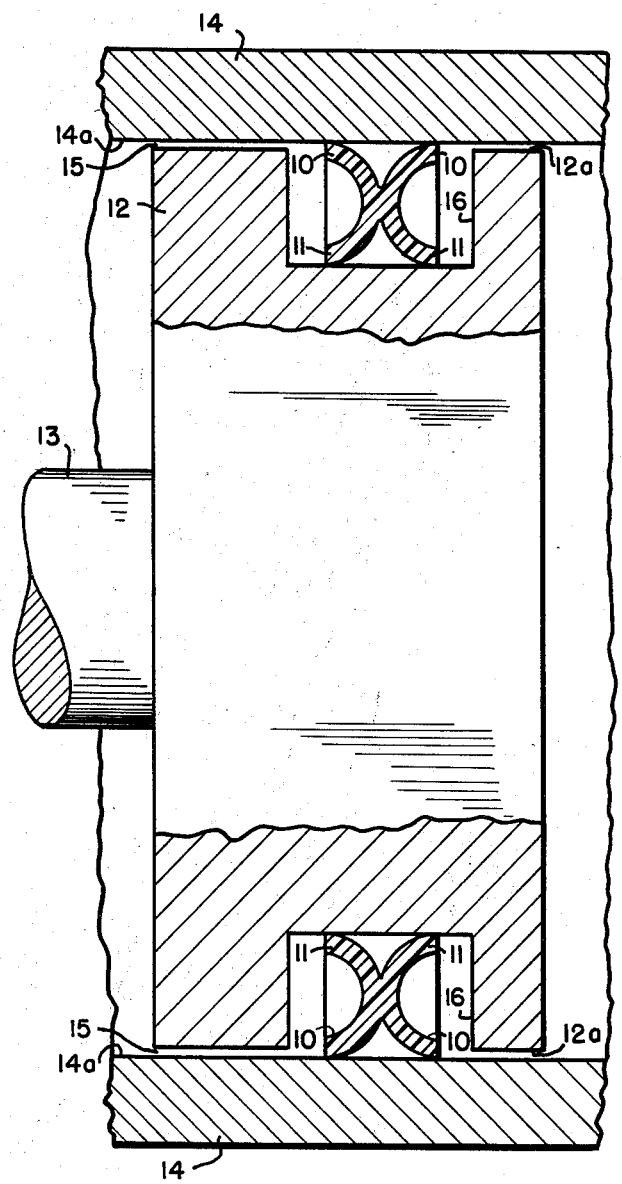
FIGURE 3 is a partial vertical section through a typical installation for my seal.

FIGURE 3 shows a typical application for my seal. A piston 12 mounted on a piston rod 13 reciprocates in a cylinder 14. The piston 12 has an outer cylindrical surface 12a and the cylinder has an inner cylindrical surface 14a forming an annular space 15 between them.

A groove 16 is cut in the periphery of the piston 12, and the seal rests in this groove. Alternatively, a groove can be cut in the wall of the cylinder 14 and the seal placed in that groove in the same manner as it is placed in the groove 16.

The lips 10 and 11 have more flexibility than a solid piece of "Teflon" since they can be bent and are capable of returning to their former position when released. Therefore, the distance between the bottom of the groove 16 and the inner cylindrical surface 14a of the cylinder 14 is less than the distance between the outermost surfaces of the lips 10 and 11 before the seal is placed in the groove, thus providing an interference fit between the seal and the inner cylindrical wall of the cylinder 14.

As the piston 12 reciprocates in the cylinder 14, the seal may slide from one side to the other of the groove 16. It will stop, however, at each side because as appears in FIGURE 3, the thickness of the lips 10 is greater than the distance across the annular space 15 between the piston and the cylinder.

The seal just described obtains all of the advantages in sealing properties of O-rings, but at the same time obtains the advantages of the material "Teflon" and avoids the defects of "Teflon," specifically its lack of resilience. The lips 10 and 11 avoid the difficulties created by lack of resilience in "Teflon," because they can be bent and when released, will return to their former position. Therefore, the degree of interference fit between the seal and the inner wall of the cylinder 14 can be varied in order to meet particular requirements of each installation, such as the temperature range in which the seal will operate. Thus, if the seals are to be operated at a temperature lower than room temperature, the initial interference between the curved lips and the cylinder wall will be high so that an interference fit is maintained at the lowest operating temperature encountered. If the seal will be operated at a temperature higher than room temperature, the initial interference will be relatively slight, thus providing for expansion of the seal as the temperature rises. As the "Teflon" expands, the lips 10 and 11 simply slide along the shaft so that there is no permanent deformation of the lips and the seal. The flexibility of the lips also makes it easy to fit the seal over the piston 12 and into the groove 16.

In certain situations, it may be desirable to press the lips 10 and 11 against the surfaces which form the space being sealed with greater force than can be obtained by the resiliency inherent in the lips alone. A modified form of my seal takes care of such situations.

Figure 5:
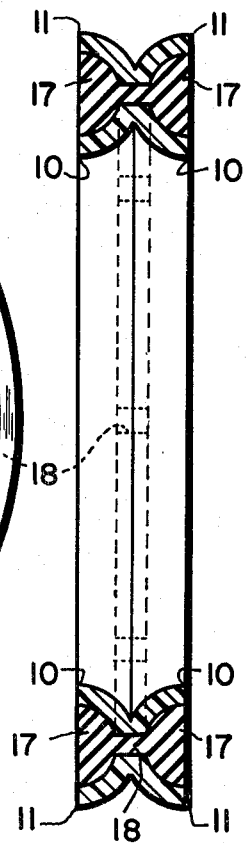
FIGURE 5 is a section along the lines V—V of FIGURE 4.

Referring to FIGURE 2, it will be seen that the side surfaces of the annular portion 8 and the surfaces of the lips 10 and 11 which extend from the said side surfaces, and which face opposite to each other, form a cavity having a semi-circular surface on each side of the seal. In the modified form of seal shown in FIGURE 5, two rings 17 of resilient material which are semi-cylindrical in cross section are placed in the cavities in the sides of the seal and engage the oppositely facing surfaces of the lips. These resilient rings press the lips 10 and 11 radially outwardly against the opposed cylindrical surfaces which form a space to be sealed. Upon a rise in temperature, the lips 10 and 11 will be pressed towards each other compressing the resilient rings 17, and, upon a decrease in temperature, the resilient rings 17 will press the lips 10 and 11 outwardly against the cylindrical surfaces.

The resilient rings 17 may be made of any suitable rubber or rubber-like material. A particularly suitable material is a silicone rubber manufactured by the General Electric Company having the designation RTV102. This is a silicone rubber which vulcanizes at room temperature and which can be bonded to the semi-cylindrical surfaces on the side surface of the Teflon seal if the surfaces are suitably etched. The surfaces can be etched by using metallic sodium dissolved in liquid ammonia. Such etching produces a brown surface to which the RTV102 silicone rubber will bond.

Figure 4:
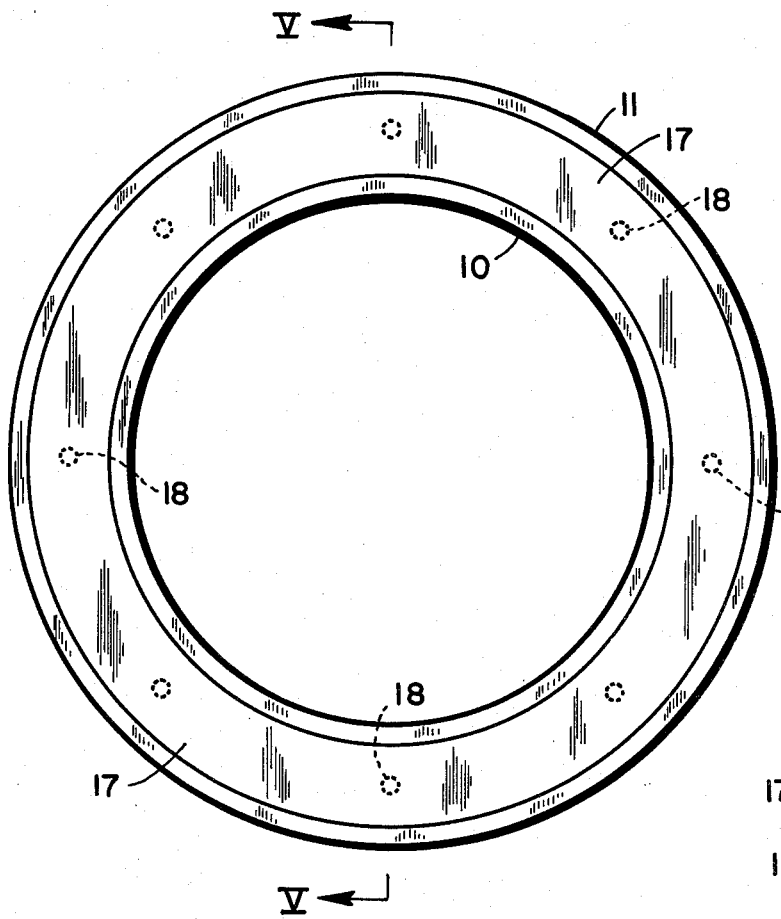
FIGURE 4 is a side view of a modification of my invention.

Conventional silicone rubbers which will not bond to a "Teflon" surface can also be used. If such silicone rubbers are used, then holes 18 are formed which extend through the annular portion 8 of the seal and, as shown in FIGURE 4, are spaced from each other around the annular portion. Both semi-circular sides of the seal and the holes 18 are filled with unvulcanized silicone rubber and then the rubber is vulcanized. The rubber within the holes 18 becomes integral with the two semi-cylindrical rings 17 of silicone rubber, and, thus, the rings are secured to the "Teflon" body of the seal.

While it has been stated that the seal which I have invented is particularly adapted for "Teflon," the seal may be made of other materials, such as acetal resin sold under the trademark "Delrin," the polyamide resin sold under the trademark "Nylon," reinforced "Teflon," etc.

While I have described certain presently preferred embodiments of my invention, it is to be understood that it may be otherwise variously embodied within the scope of the appended claims.

I claim:

1. The combination of two relatively moving members having opposed cylindrical surfaces forming an annular space between them and a closure for said space, said closure comprising a circular disk having a central circular opening through which the inner of said two members extends and a groove in the cylindrical surface of one of said members, said disk being positioned in said groove and extending across said annular space against the cylindrical surface of the other member, the annular portion of the disk adjacent the bottom of the groove and the annular portion of the disk adjacent the cylindrical surface of the member opposed to that having the groove each being bifurcated and each forming a pair of lips which curve away from each other, the curved portions of one pair engaging the bottom of the groove and the curved portions of the other pair engaging the cylindrical surface of the member opposed to that having the groove, the lips being thicker than the distance across said annular space and having end surfaces lying in planes substantially normal to said opposed cylindrical surfaces, whereby the end surfaces of the pair of lips which engage the cylindrical surface opposite to the groove extend from said surface across said annular space and into said groove.

2. A seal for closing the annular space formed between two relatively moving members having opposed cylindrical surfaces forming said space, said seal comprising a circular disk having a central opening therein, the portions of the disk extending inwardly from the inner and outer circular edges of the disk being bifurcated, and each forming two lips curved away from each other, an annular portion between the two bifurcated portions, the surface of said annular portion and the surfaces of the lips which extend from said annular portion and which face each other forming two cavities on opposite sides of the seal, and a ring of resilient material extending between the oppositely facing surfaces of the lips.

3. A seal as described in claim 2 and having holes extending through said annular portion, said holes being spaced from each other around said annular portion and resilient material extending through said holes and integral with said rings of resilient material.

References Cited by the Examiner

UNITED STATES PATENTS

| | | | |
|---|---|---|---|
| 590,276 | 9/97 | Raymond | 277—206 |
| 2,783,106 | 2/57 | Barnhardt | 277—205 |

FOREIGN PATENTS

| | | |
|---|---|---|
| 711,358 | 9/41 | Germany. |
| 851,707 | 10/52 | Germany. |
| 10,104 | 6/89 | Great Britain. |
| 18,660 | 8/96 | Great Britain. |

EDWARD V. BENHAM, *Primary Examiner.*